Dec. 23, 1952  J. E. BECKER  2,622,712
REVERSIBLE ROTARY FLUID COUPLING
Filed Jan. 13, 1950  3 Sheets-Sheet 1

Inventor
JOHN E. BECKER
By
Attorney

Dec. 23, 1952      J. E. BECKER      2,622,712
REVERSIBLE ROTARY FLUID COUPLING
Filed Jan. 13, 1950      3 Sheets-Sheet 2

Inventor
JOHN E. BECKER
By
Attorney

Dec. 23, 1952 J. E. BECKER 2,622,712
REVERSIBLE ROTARY FLUID COUPLING
Filed Jan. 13, 1950 3 Sheets-Sheet 3
FIG. 4.
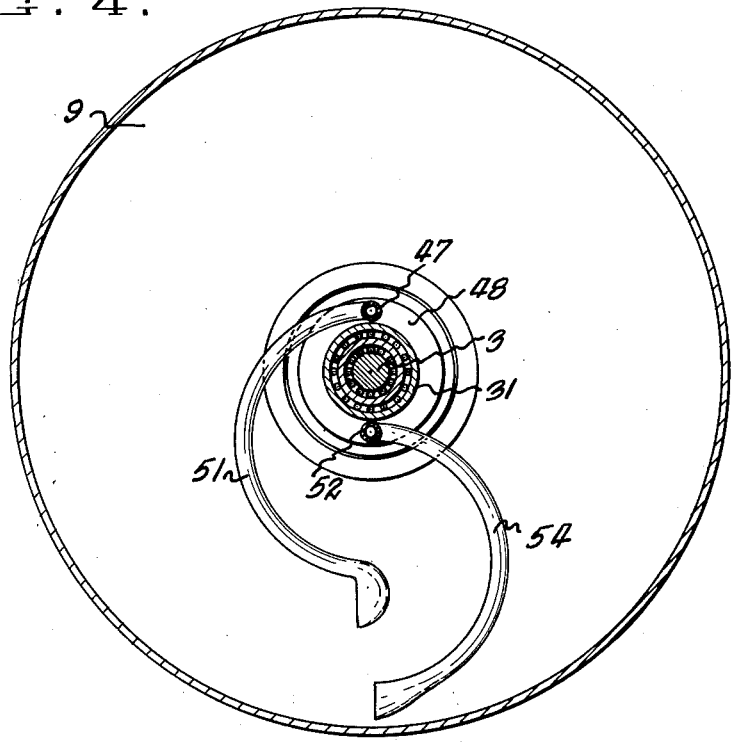
Inventor
JOHN E. BECKER
By
Attorney Patented Dec. 23, 1952

2,622,712

UNITED STATES PATENT OFFICE 2,622,712

REVERSIBLE ROTARY FLUID COUPLING

John Edward Becker, Darlington, Ontario, Canada, assignor to Atlas Polar Company Limited, Toronto, Ontario, Canada, a corporation of Canada Application January 13, 1950, Serial No. 138,378

17 Claims. (Cl. 192—3.2)

My invention relates to improvements in reversible fluid couplings, and the purpose of the invention is to provide a hydraulic transmission which is primarily devised for use in power driven vehicles, the object being to provide a transmission incorporating several fluid coupling forward speeds and a fluid coupling reverse.

A further and particular object of the invention is to design a transmission having a plurality of annular fluid reservoirs which rotate with the couplings, the fluid being transmitted from the couplings to the reservoirs and vice versa by the use of a plurality of swingable scoop pipes which are contained within the reservoirs and the coupling assemblies.

Another object of the invention is to provide a transmission wherein one of the fluid coupling assemblies contains a set of torque increasing vanes to permit the power unit to develop sufficient R. P. M. for highest torque in relation to the load and the R. P. M. of the driven shaft, and to also provide another of the fluid couplings with radial fluid flow reversing vanes whereby such coupling rotates the driven shaft in the reverse direction to the driving shaft.

A still further object of the invention is to design a fluid coupling transmission mechanism, wherein a direct mechanical driving connection may be established, at will, between the driving shaft and the driven shaft.

With the foregoing and other objects in view as shall hereinafter appear, my invention consists of a reversible fluid coupling constructed and arranged all as hereinafter more particularly described and illustrated in the accompanying drawings in which:

Fig. 4 is a transverse cross-sectional view taken through the line 4—4, Fig. 1.

Like characters of reference indicate corresponding parts in the different views of the drawings.

Figure 1:
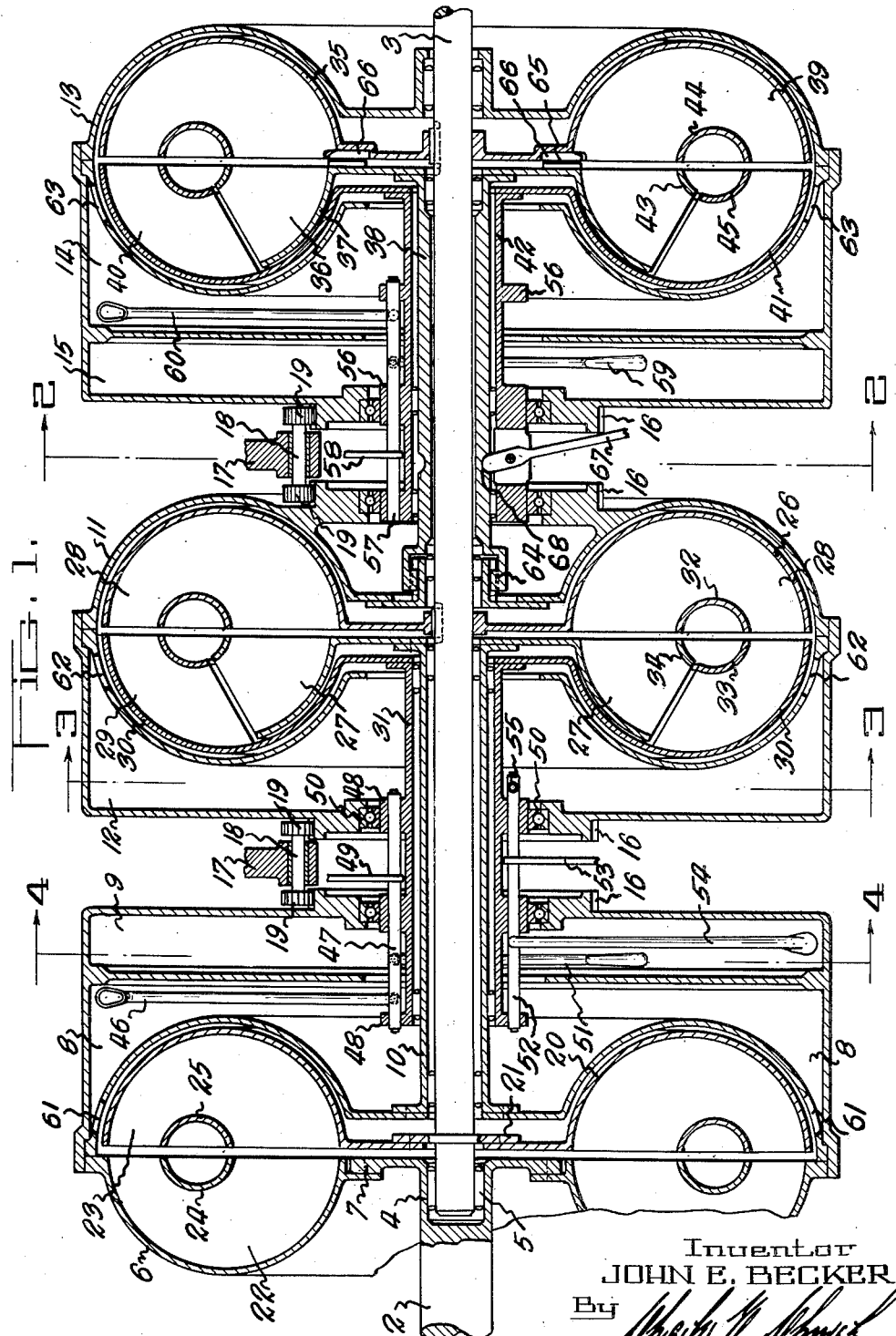
Fig. 1 is a longitudinal cross-sectional view through the hydraulic transmission assembly.

The complete transmission arrangement which comprises three fluid coupling assemblies and two fluid reservoirs positioned therebetween, is designed to rotate as a unit, being carried by a driving shaft 2 and a driven shaft 3. The driven shaft 3 extends through the major part of the length of the transmission and the inner end of the driving shaft 2 is formed with a bore 4 in which the end of the driven shaft 3 is mounted within a roller bearing 5 contained within the bore 4.

The driving shaft 2 carries an impeller housing 6 of toroidal form which is secured to a flange 7 on the shaft 2. The impeller housing 6 is connected at its periphery to a fluid chamber 8 to which a rotatable reservoir 9 is attached. The impeller housing 6 is also secured to the end of a sleeve 10 surrounding the driven shaft 3 and extending to the second fluid coupling assembly.

The second fluid coupling assembly comprises an impeller housing 11 of toroidal form and connected at its periphery to a fluid chamber 12, the chamber 12 being adjacent to the fluid reservoir 9.

The reverse fluid coupling contains an impeller housing 13 of toroidal form which is connected at its periphery to a fluid chamber 14 to which a rotatable reservoir 15 is attached. The three fluid coupling units rotate in unison and are coupled by two sets of gears which are interposed between the coupling units. The sets of gears are provided for the purpose of permitting the installation of the mechanisms for swinging the scoop pipes as shall be hereinafter explained.

Figure 2:
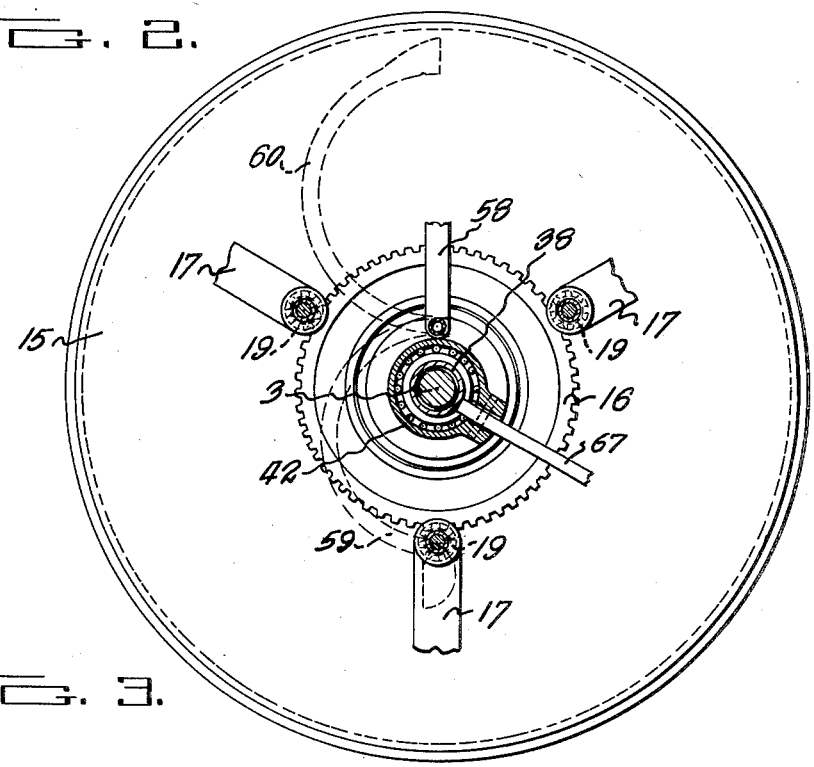
Fig. 2 is a transverse cross-sectional view taken through the line 2—2, Fig. 1.

The fluid reservoirs 9 and 15 and the fluid chamber 12 each carries a central gear 16 upon its outer face, of the type shown in Fig. 2, which illustrates the gear 16 upon the face of the reservoir 15. The gears 16 are all of the same diameter and pitch. Two spiders or other similar arrangements, not shown, are mounted upon the vehicle and incorporate inwardly directed arms 17 which extend between the coupling units to form mountings for spindles 18 which are journalled therein, each spindle carrying a pair of gears 19 which mesh with the gears 16. It will be readily appreciated by this simple gear arrangement that the impeller housings, fluid chambers and fluid reservoirs will rotate in unison at the same speed.

The impeller housing 6 encases a runner housing 20 which is secured to a flange 21 formed upon the driven shaft 3. The impeller housing 6 carries a plurality of suitable radial impeller vanes 22 and the runner housing 20 a plurality of suitable runner vanes 23, the vanes supporting the usual ring members 24 and 25 whereby passages for the fluid transmission of power are formed.

The impeller housing 11 encases a runner housing 26 which is keyed to the driven shaft 3. The impeller housing contains a plurality of radial impeller vanes 27 of reduced size, which are secured to the sleeve 10 extending from the impeller housing 6, whereby the vanes 27 rotate in unison with the impeller housing 6 and the impeller housing 11. The runner housing contains a plurality of runner vanes 28, and the impeller housing 11 also contains a plurality of stationary torque increasing vanes 29 which are mounted upon a stationary curved shell 30 carried upon a stationary sleeve 31 encircling the rotating sleeve 10. The vanes support the usual ring forming members 32, 33 and 34.

The impeller housing 13 encases a runner housing 35 which is keyed to the driven shaft 3. The impeller housing carries a plurality of radial impeller vanes 36 of reduced size which are mounted upon a dished ring 37 having its flange attached to a sleeve 38 extending and attached to the impeller housing 11, whereby the vanes 36 rotate in unison with the impeller housing 11 and the impeller housing 6. The runner housing contains a plurality of radial runner vanes 39, and the impeller housing 13 also contains a plurality of stationary fluid flow reverse vanes 40 which are mounted upon a stationary dished ring 41 carried upon a stationary sleeve 42 encircling the rotating sleeve 38. The fluid flow reverse vanes 40 follow standard practice in design and arrangement, being so inclined to the direction of the rotation of the impeller vanes 36 that the contained fluid impacts the runner vanes 39 in the reverse direction to the direction of rotation of the impeller vanes 36 whereby the runner 35 rotates in the opposite direction to the impeller. The vanes support the usual ring forming members 43, 44 and 45.

When the transmission is in operation, fluid is only contained in one coupling unit, the other two coupling units being empty and their fluid contained within one or other of the fluid reservoirs 9 and 15. To evacuate fluid from the impeller housings or reservoirs and also to inject fluid thereinto, I furnish a plurality of scoop pipes which are swingably mounted to be swung into and out of the centrifugal fluid rings formed within the impeller housing chambers and the reservoirs.

The impeller housing chamber 8 contains a swingable scoop pipe 46 which is formed with a mouth in its free end and mounted upon a swingable tube 47 which is journalled within flanges 48 on the sleeve 31 and projects into the chamber 8. The tube 47 is rotated in any suitable manner to swing the pipe 46, as by the manually actuated arm 49. The reservoir 9 and the fluid chamber 12 rotate about the flanges 48 of the stationary sleeve 31, being carried upon roller bearing assemblies 50. The tube 47 also carries a swingable scoop pipe 51 which is contained within the fluid reservoir 9 and is so positioned in relation to the scoop pipe 46 that rotation of the tube 47 causes one scoop pipe to swing into its centrifugal fluid ring while the other scoop pipe swings away from its centrifugal fluid ring.

The flanges 48 also carry a second tube 52 which is journalled therein, such tube being rotated by means of a manual lever 53 and carrying a pair of scoop pipes 54 and 55. The scoop pipe 54 is contained within the fluid reservoir 9 and the scoop pipe 55 is contained within the fluid chamber 12 of the impeller housing 11, see Fig. 3. These scoop pipes are also so arranged upon the tube 52 in relation to one another that as one scoop pipe enters its centrifugal fluid ring, the other scoop pipe moves away from its centrifugal fluid ring.

Figure 3:
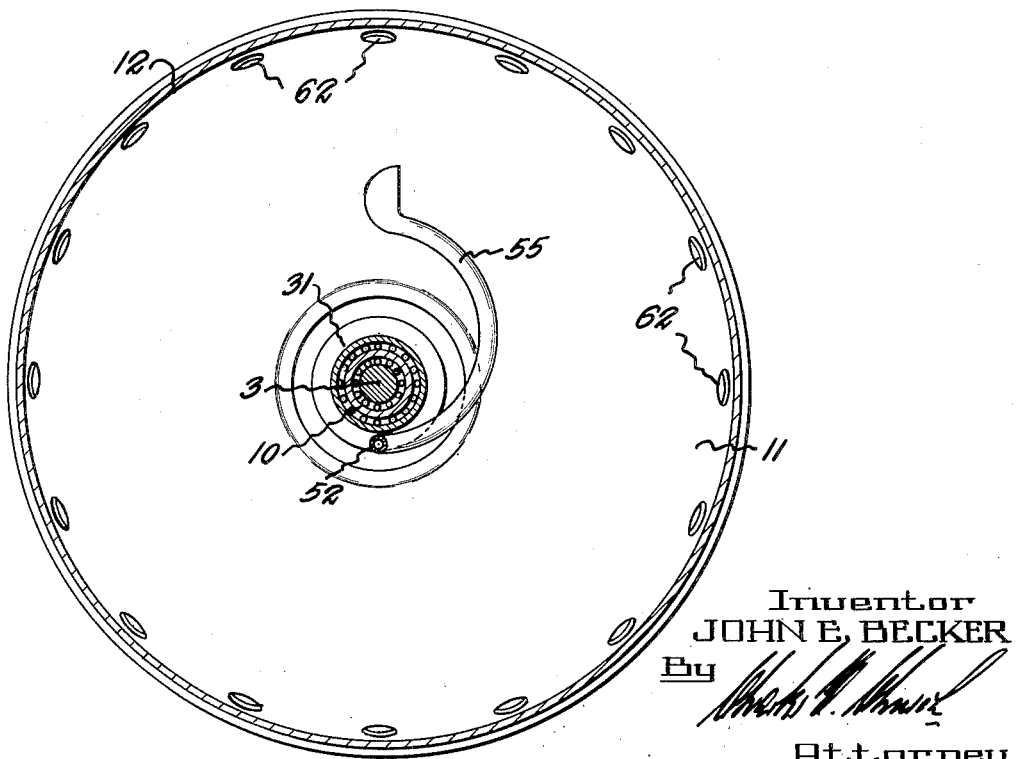
Fig. 3 is a transverse cross-sectional view taken through the line 3—3, Fig. 1.

The stationary sleeve 42 is formed with a plurality of flanges 56 which carry a tube 57 journalled therein, the tube being rotated by means of a manually operated lever 58. The tube extends through the reservoir 15 to project into the fluid chamber 14, and carries a pair of swingable scoop pipes 59 and 60. The scoop pipe 59 is contained within the fluid reservoir 15 and the scoop pipe 60 contained within the fluid chamber 14. The scoop pipes are so positioned in relation to one another that as one scoop pipe enters its centrifugal fluid ring, the other scoop pipe moves away from its centrifugal fluid ring. The various scoop pipes as shown in Figs. 2, 3 and 4 are suitably curved to swing about the central shaft assembly, following standard practice.

The operation of my transmission is extremely simple, and as shown in Fig. 1, the impeller housing assembly 6 constitutes the high ratio, the impeller housing 11, low ratio, and the impeller housing 13, reverse. When the drive is being transmitted through the impeller housing assembly 6, the housing, and the fluid chamber 8 contain fluid and the drive is transmitted therethrough from the driving shaft 2 to the driven shaft 3. The scoop pipe 46 is in the inwardly swung position out of contact with the centrifugal fluid ring in the chamber 8, and the scoop pipe 51 in the outwardly swung position in the reservoir 9 which is substantially empty. To disconnect the power transmission, the tube 47 is rotated to submerge the end of the scoop pipe 46 in the fluid ring in the chamber 8 whereby the fluid is evacuated therefrom and passed through the tube 47 to be ejected into the reservoir 9 through the scoop pipe 51 which is in the withdrawn position. The impeller housing 6 carries a plurality of peripherally arranged orifices 61 through which the fluid in the coupling passes into the chamber 8 to be removed therefrom by the scoop pipe 46. When it is desired to transmit power through the impeller housing assembly 6, the tube 47 is rotated whereby the end of the scoop pipe 51 becomes submerged in the fluid ring in the reservoir 9 and the fluid scooped therefrom passed through the tube 47 and withdrawn scoop pipe 46 into the chamber 8 from where it passes through the orifices 61 into the coupling.

To bring the low speed transmission into operation the fluid is removed from the reservoir 9 and passed into the chamber 12 of the impeller housing 11. This is accomplished by turning the tube 52 whereby the end of the scoop pipe 54 on such tube becomes submerged within the centrifugal fluid ring in the reservoir 9; the fluid scooped therefrom passing through the tube 52 to be ejected through the withdrawn scoop pipe 55 into the chamber 12 from where it passes through the peripheral orifices 62 into the coupling. As the coupling contains the stationary torque increasing vanes 29, the rotative speed of the runner vanes 28 will be less than the rotative speed of the impeller vanes 27 so that the driven shaft 3 will rotate at a less speed than the driving shaft 2. The fluid chamber 12 in the coupling is evacuated by turning the tube 52 whereby the scoop pipe 55 enters the centrifugal fluid ring in the chamber 12 to remove the fluid therefrom which passes through the tube 52 and through the withdrawn scoop pipe 54 to pass into the reservoir 9.

The reverse impeller unit carries its own supply of fluid apart from the fluid in the other two units, and when it is desired to run the driven shaft 3 in reverse to the driving shaft 2, fluid is evacuated from the two forward driving units and fluid injected from the reservoir 15 into the impeller housing 13 in the reverse unit. This is accomplished by turning the tube 57 whereby the end of the scoop pipe 59 enters the centrifugal fluid ring in the reservoir 15 thus causing the fluid to pass along the tube 57 and enter the fluid chamber 14 through the withdrawn scoop pipe 60; the fluid passing from the chamber through the peripheral orifices 63 into the coupling. As the coupling contains the stationary fluid reverse flow vanes 40, the runner housing 35 will rotate in the opposite direction, and as such housing is keyed to the driven shaft 3, the driven shaft will rotate in the opposite direction to the driving shaft 2. To remove the fluid from the reverse coupling, the tube 57 is turned to submerge the end of the scoop pipe 60 in the centrifugal fluid ring in the fluid chamber 14 whereby the fluid is removed from the chamber and coupling and transferred into the reservoir 15.

Due to lack of space, Fig. 1 of the drawings is not altogether in correct proportion, as in practice, the reservoirs 9 and 15 would be of greater volume than shown in order to accomodate the required quantity of fluid.

As one of the objections to fluid transmission in automobiles, is the lack of direct mechanical connection between the engine and the driven shaft, I have incorporated a simple construction to provide a direct mechanical drive. This is accomplished by so mounting the sleeve 38 that it may be slid upon the driven shaft 3. As previously explained, the sleeve 38 constitutes the driving connection between the impeller housing 11 and the impeller vanes 36 in the reverse unit. The end of the sleeve which projects into the impeller housing 11 carries a spline assembly 64 conecting it to the impeller housing 11 and which permits the sleeve to slide without disturbing its driven connection. The ring 37 carrying the impeller vanes 36 is formed with a plurality of radial teeth 65 in its face, and the runner housing 35 is formed with a plurality of oppositely positioned radial slots 66 into which the teeth 65 may enter. The sleeve 38 is slid under the action of a manual lever 67 which is swingably mounted upon the sleeve 42 and has its end contained within an annular groove 68 in the sleeve 38. When it is desired to obtain a direct mechanical connection between the driving shaft 2 and the driven shaft 3, the lever 67 is swung in a clockwise direction whereby the sleeve is slid to the right thus causing the teeth 65 to enter the slots 66 in the runner housing 35 which is keyed to the driven shaft 3. As the impeller housing 11 is directly coupled to the driving shaft 2, a direct mechanical driving connection is obtained. To disconnect this drive the sleeve is slid in the opposite direction.

From the foregoing description, it will be apparent that by my construction any desired speed of the driving shaft may be obtained by manipulation of the scoop pipes to instantly produce the desired result. Although I have shown and described a particular embodiment of my invention, it is to be understood that I may make such changes and alterations as I may from time to time deem necessary, without departing from the spirit of my invention as set forth in the appended claims.

What I claim as my invention is:

1. In a reversible fluid coupling, a driving shaft, a driven shaft in alignment with the driving shaft, three coupling housings rotatable in unison with the driving shaft, three sets of impeller members rotatable in unison with the housings and each containing a plurality of radial impeller blades, three runner members coupled to the driven shaft in juxtaposition to the blades of the impeller members and each containing a plurality of radial blades driven by an impeller member through the medium of a fluid, three annular fluid chambers rotatable with the housings, each chamber being in fluid connection with an impeller member and a runner member, a set of stationary radial fluid flow reversing vanes contained in one of the coupling housings between the outlet of the impeller and the inlet of the runner in said housing and under the influence of which the runner member is rotatable in the opposite direction to the impeller member, a set of stationary torque increasing vanes contained in another of the coupling housings between the outlet of the impeller and the inlet of the runner in said housing, a plurality of annular fluid reservoirs rotatable with two of the coupling housings and concentric with the driving and driven shafts, three swingably mounted fluid emptying scoop pipes for removing fluid from the centrifugal fluid rings in the annular fluid chambers and fixed against rotation with the annular fluid chambers and each in fluid connection with one of said rotatable fluid reservoirs, and a plurality of swingably mounted fluid filling scoop pipes fixed against rotation with the rotatable fluid reservoirs and contained within the rotatable fluid reservoirs for removing fluid from their centrifugal fluid rings and each in communication with one of said annular fluid chambers.

2. A reversible fluid coupling as claimed in claim 1, wherein the impeller members are of toroidal form and the runner members are contained within the impeller members.

3. A reversible fluid coupling as claimed in claim 1, wherein the impeller members are of toroidal form and the runner members are contained within the impeller members, and the impeller members contain a plurality of peripherially arranged orifices which constitute the fluid connection between each impeller member and its annular fluid chamber.

4. A reversible fluid coupling as claimed in claim 1, wherein there are two of said annular fluid reservoirs, two of the annular fluid chambers being in communication with one of the reservoirs through two of the emptying scoop pipes, and the third annular fluid chamber is connected to the impeller member containing the reverse fluid flow vanes and is in communication through the third emptying scoop pipe with the other reservoir.

5. A reversible fluid coupling as claimed in claim 1, wherein the impeller members are of toroidal form and the runner members are contained within the impeller members, and wherein there are two annular fluid reservoirs, two of the annular fluid chambers being in communication with one of the reservoirs through two of the emptying scoop pipes, and the third annular fluid chamber is connected to the impeller member containing the reverse fluid flow vanes and is in communication through the third emptying scoop pipe with the other reservoir.

6. A reversible fluid coupling as claimed in claim 1, wherein the impeller members are of toroidal form and the runner members are contained within the impeller members, the impeller members contain a plurality of peripherally arranged orifices which constitute the fluid connection between the impeller members and the annular fluid chambers, and wherein there are two annular fluid reservoirs, two of the annular fluid chambers being in communication with one of the reservoirs through two of the emptying scoop pipes, and the third annular fluid chamber is connected to the impeller member containing the reverse fluid flow vanes and is in communication through the third emptying scoop pipe with the other reservoir.

7. A reversible fluid coupling as claimed in claim 1, wherein the two annular fluid reservoirs are contained within two of the coupling housings adjacent to their fluid chambers.

8. A reversible fluid coupling as claimed in claim 1, wherein the two annular fluid reservoirs are contained within two of the coupling housings adjacent to their fluid chambers, and wherein the impeller members are of toroidal form and the runner members are contained within the impeller members.

9. In a reversible fluid coupling, a driving shaft, a driven shaft in alignment with the driving shaft, three coupling housings rotatable in unison with the driving shaft, three sets of impeller members rotatable in unison with the housings and each containing a plurality of radial impeller blades, three runner members coupled to the driven shaft in juxtaposition to the blades of the impeller members and each containing a plurality of radial blades driven by an impeller member through the medium of a fluid, three annular fluid chambers rotatable with the housings, each chamber being in fluid connection with an impeller member and a runner member, a set of stationary radial fluid flow reversing vanes contained in one of the coupling housings between the outlet of the impeller and the inlet of the runner in said housing and under the influence of which the runner member is rotatable in the opposite direction to said impeller member, a set of stationary torque increasing vanes contained in another of the coupling housings between the outlet of the impeller and the inlet of the runner in said housing, two annular fluid reservoirs rotatable concentrically with the coupling, one of the reservoirs being in communication with two of the annular fluid chambers and the other reservoir in communication with the third annular fluid chamber which is connected to the coupling housing containing the reverse fluid flow vanes, three swingably mounted fluid emptying scoop pipes each in communication with an annular fluid chamber for removing fluid from the centrifugal fluid rings in the three annular chamber members, the emptying scoop pipe of the annular chamber member of the reverse vane impeller member being in communication with one annular fluid reservoir and the two emptying scoop pipes of the other two annular fluid chambers being in communication with the other annular fluid reservoir, two swingably mounted fluid filling scoop pipes contained within one of the annular fluid reservoirs, each of the said fluid filling scoop pipes being in communication with a coupling housing, a third swingably mounted filling scoop pipe contained within the other annular reservoir and in communication with the annular fluid chamber of the reverse vane containing coupling housing, the fluid filling scoop pipes being fixed against rotation with the rotatable fluid reservoirs.

10. A reversible fluid coupling as claimed in claim 9, wherein the two annular fluid reservoirs are contained within two of the coupling housings adjacent to their fluid chambers.

11. A reversible fluid coupling as claimed in claim 9, wherein the coupling is divided into three units, each unit containing an impeller member, and two sets of unit connecting gears interposed between and constituting a coupling arrangement between the units whereby the three units rotate in unison.

12. A reversible fluid coupling as claimed in claim 9, wherein the impeller members are of toroidal form and the runner members are contained within the impeller members, the impeller members containing a plurality of peripherally arranged orifices which constitute the fluid connection between the impeller members and the annular fluid chambers.

13. A reversible fluid coupling as claimed in claim 9, wherein the coupling is divided into three units, each unit containing an impeller member, and two sets of unit connecting gears interposed between and constituting a coupling arrangement between the units whereby the three units rotate in unison, and wherein the impeller members are of toroidal form and the runner members are contained within the impeller members, the impeller members containing a plurality of peripherally arranged orifices which constitute fluid connection between the impeller members and the annular fluid chambers.

14. A reversible fluid coupling as claimed in claim 9, wherein two of the impeller and runner assemblies rotate the driven shaft in the same direction as the driving shaft, one of said two impeller and runner assemblies containing a set of stationary radial torque increasing vanes.

15. A reversible fluid coupling as claimed in claim 9, wherein the coupling is divided into three units, each unit containing an impeller member coupled to the driving shaft and a runner member coupled to the driven shaft, two sets of unit connecting gears interposed between and constituting a coupling arrangement between the units whereby the three units rotate in the same direction in unison, two of the impeller and runner assemblies rotating the driven shaft in the same direction as the driving shaft, one of the said two impeller and runner assemblies containing a set of stationary radial torque increasing vanes, and the third impeller and runner assembly rotating the driven shaft in the opposite direction to the driving shaft.

16. A reversible fluid coupling as claimed in claim 9, wherein a slidable rotatable sleeve encircles the driven shaft and is coupled to one of the rotatable housings, and releasable mechanical means for coupling the sleeve to the driven shaft.

17. A reversible fluid coupling as claimed in claim 9, wherein a slidable rotatable sleeve encircles the driven shaft and is slidably coupled to one of the rotatable housings, and teeth formed upon the end of the sleeve and retractably engageable within slots in one of the runner members.

JOHN EDWARD BECKER.

REFERENCES CITED

The following references are of record in the file of this patent:

UNITED STATES PATENTS

| Number | Name | Date |
|---|---|---|
| 1,757,827 | Bauer et al. | May 6, 1930 |
| 2,187,656 | Kiep et al. | Jan. 16, 1940 |
| 2,298,310 | Ray | Oct. 13, 1942 |
| 2,492,456 | Becker | Dec. 27, 1949 |